United States Patent [19]
Sinibaldo

[11] 3,779,285
[45] Dec. 18, 1973

[54] METHOD FOR OBTAINING PERFORATED TUBULAR FOOD CASINGS

[75] Inventor: Armando J. Sinibaldo, Brookfield, Ill.

[73] Assignee: Union Carbide Corporation, New York, N.Y.

[22] Filed: May 1, 1969

[21] Appl. No.: 821,040

[52] U.S. Cl............... 138/118.1, 83/317, 156/253, 200/46 F, 264/156
[51] Int. Cl............................................ A22c 13/00
[58] Field of Search ............... 83/347, 659; 99/175, 99/176, 174, 171 LD; 206/46 F; 229/DIG. 14; 156/253; 264/156

[56] References Cited
UNITED STATES PATENTS

| 2,000,835 | 5/1935 | Goldberger | 99/176 |
|---|---|---|---|
| 2,430,818 | 11/1947 | Kellermann | 99/175 X |
| 2,621,741 | 12/1952 | Kane | 83/347 X |
| 3,039,713 | 6/1962 | Nye | 83/347 X |
| 3,126,777 | 3/1964 | Shabram | 83/659 X |
| 3,508,461 | 4/1970 | Stream | 83/347 X |
| 3,430,560 | 3/1969 | Nettleman | 83/347 |
| 3,032,453 | 5/1962 | Ford | 156/253 X |
| 3,507,443 | 4/1970 | Gerard | 229/55 |
| 3,546,327 | 12/1970 | Ruda | 229/DIG. 14 |
| 3,552,637 | 4/1971 | Swinford | 99/171 LP |
| 3,437,551 | 4/1969 | Marshack | 156/253 X |
| 2,748,863 | 6/1956 | Benton | 264/156 X |

Primary Examiner—Robert Halper
Attorney—Paul A. Rose, John F. Hohmann and Franklyn Schoenberg

[57] ABSTRACT

Perforated tubular food casings having substantially free-draining vent holes are obtained by passing a flattened web of tubular food casing between contiguous, counter-rotating punch and support rolls. Positioned on the circumference of one roll are a plurality of radially mounted, flat-faced, sharp-edged punches adapted to cut through the casing and indent a resilient support surface on the other roll.

4 Claims, 8 Drawing Figures

PATENTED DEC 18 1973　3,779,285

INVENTOR.
Armando J. Sinibaldo
BY Salvatore C. Mitri
ATTORNEY

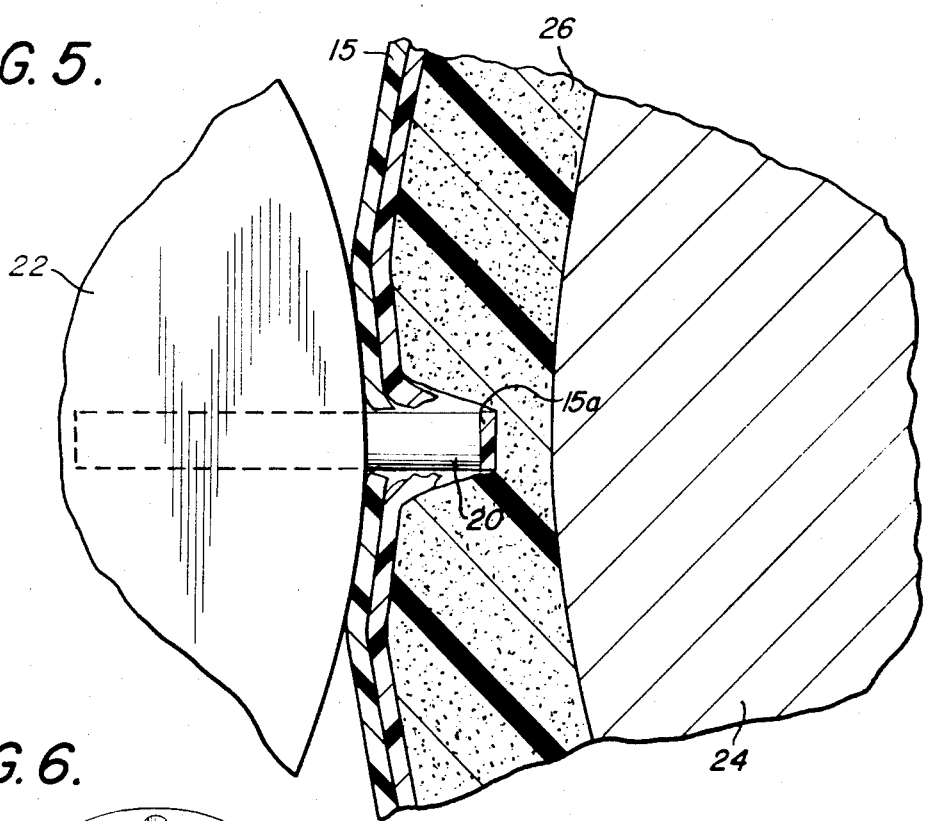
FIG. 5.
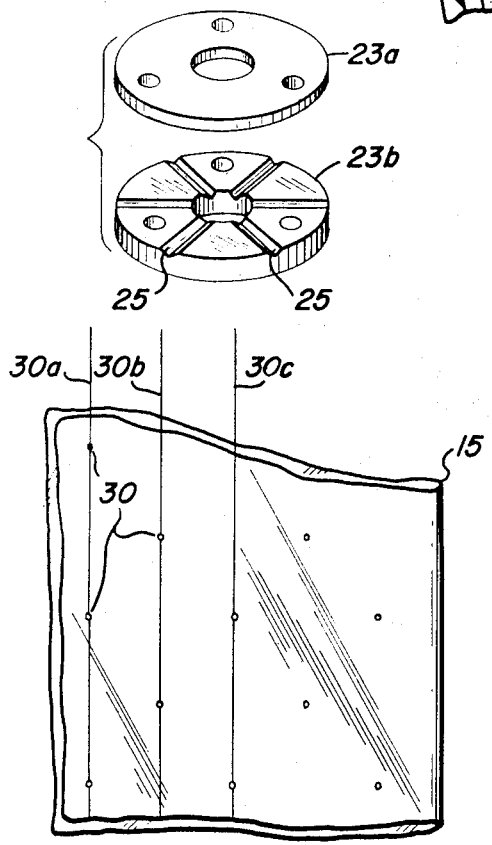
FIG. 6.
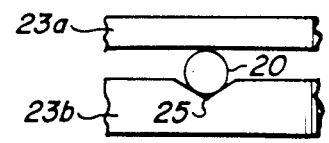
FIG. 6a
FIG. 7.
INVENTOR.
Armando J. Sinibaldo
ATTORNEY

METHOD FOR OBTAINING PERFORATED TUBULAR FOOD CASINGS

This invention relates to a method for obtaining perforated tubular food casings by die cutting perforations through both plies of a flattened web of tubular food casing.

The food casings to which this invention relates are those generally employed in applications in the meat packing industry where wall strength of the casings is important due to the stresses imposed upon it during the stuffing, shaping and/or processing steps. These casings are typically obtained from regenerated cellulose and can have fibrous webs embedded in them to impart greater wall strength to them. Cellulosic food casings having fibrous webs embedded in their walls are termed in the art as "fibrous food casings."

These food casings are employed to produce smoked meat products such as hams, butts, picnics, and the like and semi-dry sausage products such as cooked bologna, summer, cervelat, and the like. It is desirable to provide the food casings with a plurality of vent holes or perforations in order to enhance and facilitate the draining of any water, fat or jelly pockets formed during or after processing.

When providing these food casings with vent holes or perforations, it has been found that the size of the vent holes should be quite small so that a meat product will not protrude through the vent holes or a meat emulsion stuffed in the food casing will not leak out before it is processed. Generally, the vent holes and perforations should be on the order of from about 0.008 inch to 0.024 inch in diameter.

Heretofore, food casings have been provided with vent holes and perforations by pricking through both plies of a flattened web of tubular food casing with sharp, pointed needles. This resulted in creating inwardly disposed vent flaps in the upper ply of the food casing and outwardly disposed vent flaps in the bottom ply of the food casing. Also, the vent flaps in the upper ply were generally larger than those in the bottom ply and had somewhat jagged edges. Due to the non-uniform configuration of these vent holes and perforations about the circumference of the food casings, the products stuffed therein could not be uniformly bled of water, fat and jelly pockets. Additionally, these food casings occasionally ruptured at the vent holes during the stuffing and processing steps.

It is an object of this invention to provide a method for obtaining a perforated tubular food casing wherein the perforations defined therein are substantially free of inwardly disposed vent flaps.

This and other objects will become more apparent from the ensuing description.

The objects of the invention can be attained by providing a method and apparatus comprising, in general, a pair of counter-rotating rolls, one of said rolls having a plurality of flat-faced, sharp-edged punches radially mounted on its circumference and the other roll having a resilient surface mounted on its circumference; means for providing a nip between the two rolls; and, means for passing a flattened web of tubular food casing to and through the nip of the counter-rotating rolls.

The invention will become more clear when considered together with the accompanying drawing wherein;

FIG. 5 is a schematic, enlarged elevational view of a portion of the apparatus shown in FIG. 4;

FIG. 6 is an exploded, perspective view of one embodiment of a punch mounting means of the apparatus of the invention;

FIG. 6a is a schematic, enlarged edge view of the mounting means shown in FIG. 6; and, FIG. 7 is a schematic plan view, part broken away, illustrating the food casing obtained by the apparatus of the present invention.

Figure 1:
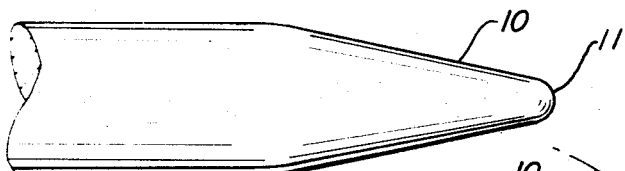
FIG. 1 is a side elevational view of a portion of the type of needles generally utilized heretofor.

Turning now to the drawing, there is shown in FIG. 1 the general configuration of a needle of the type heretofore employed to prick or stick vent holes or vent perforations in flattened food casings, the needle being indentified by reference numeral 10. As can be seen, these needles 10 generally have tapered ends terminating in sharpened or rounded points 11 such as are found on phonograph needles.

Figure 2:
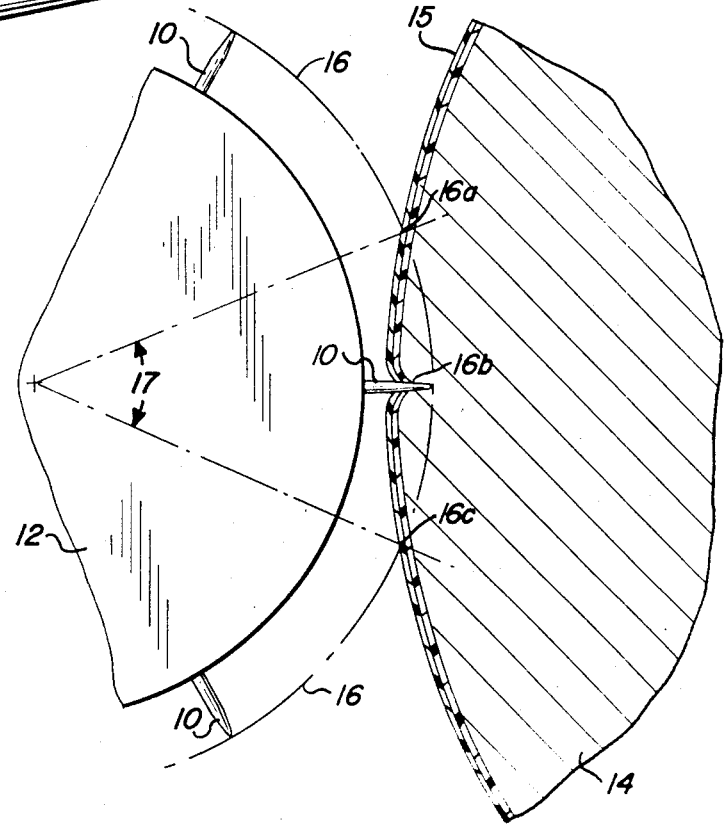
FIG. 2 is a schematic elevational view, part in section, of a portion of the type of apparatus heretofore generally employed.

As shown in FIG. 2, these needles 10 are typically mounted on a needle mounting roll 12 with their sharpened or rounded points 11 protruding outwardly. A back up roll 14 is positioned adjacent the needle roll 12 at a distance sufficient to permit a flattened web of tubular food casing 15 to pass therebetween so that both plies of the food casing 15 are pricked through by the needles 10 to provide vent holes and perforations in both plies of the flattened tubular food casing 15.

In FIG. 2, reference numeral 16 denotes the line showing the arc of travel of the needles 10 before, during and after pricking through the flattened tubular food casing 15. Reference numeral 16a denotes the point at which the needle 10 begins to penetrate the food casing 15; reference numeral 16b denotes the point at which the needle 10 has penetrated through both plies of the food casing 15; reference numeral 16c denotes the point at which the needle 10 is removed from both plies of the food casing 15; and, reference numeral 17 denotes the angle subtended by points 16a and 16c. Hence, the subtended angle 17 is equal to the arc of rotation of needle 10 between points 16a and 16c on line 16. In the prior art apparatus shown in FIGS. 1 and 2, the size of the vent holes formed in the flattened tubular food casing 15, were attempted to be controlled by regulating the depth of penetration of the tapered ends 11 of the needles 10.

Figure 3:
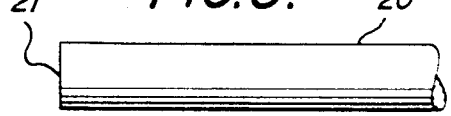
FIG. 3 is a side elevational view of a portion of the punch employed in the present invention.

In FIG. 3, the punch of the present invention is identified by reference numeral 20 and its sharp-edged, substantially flat face is identified by reference numeral 21. Punch 20 can be fabricated from various materials such as high carbon steel wire, rods or tubing and the like.

The configuration or shape of the shank of punch 20 of the present invention is not critical. However, the cross-section of the shank of punch 20 is preferably smaller than its cutting face. The cutting face of the punch 20, can be round, elliptical and rectangular or square with rounded corners, and the like. In a preferred embodiment, the cross-sectional configuration of the shank and cutting face of the punch 20 are round or circular.

The punch 20 should be machined so that its cutting edge is square with or perpendicular to the shank of the punch to provide a sharp-edged, flat face 21. When the punch 20 is round, the diameter of its cutting edge should not be less than the shank of the punch and is, preferably from about 0.008 inch to 0.024 inch when perforating food casings having a flat width of from about, for example, 3.0 inch to 12.5 inch. Additionally, the diameter of the cutting edge of punch 20 should be such that the diameter of the perforations formed in the food casing 15 do not deleteriously weaken the wall of the casing and are, preferably, from about two to six times greater than a single wall thickness of the food casing 15.

Figure 4:
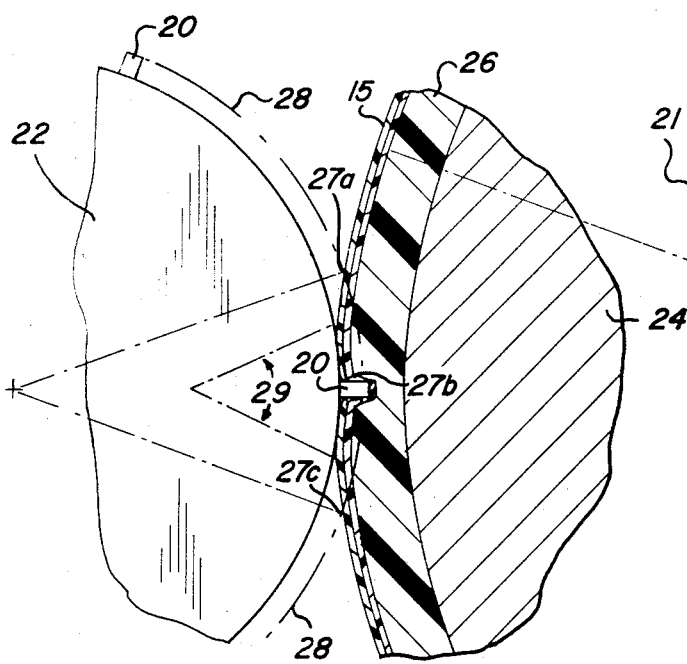
FIG. 4 is a schematic elevational view, part in section, of a portion of the apparatus of the present invention.

In assembly, as shown in FIGS. 4 and 5, a plurality of punches 20 are radially mounted on a punch roll, generally identified by reference numeral 22. The distance which punch 20 extends from punch roll 22 will, of course, depend upon the single wall thickness of the food casing 15 to be perforated. Generally, the distance which the body of the punch 20 extends from the surface of the punch roll 22 should be at least about 150% of the total thickness of the plies of food casing 15 to be perforated.

Positioned adjacent punch roll 22 is a support roll 24. Punch roll 22 and support roll 24 are mounted on parallel shafts (not shown) and caused to counter-rotate with respect to each other by means of mating gears (not shown) secured to their respective shafts and positioned to provide a nip therebetween.

Support roll 24 is provided with a resilient surface 26 such as rubber, polyurethane and the like. Resilient surface 26 should be sufficiently resilient to permit slight penetration therein of punch 20 yet provide sufficient resistance for the flattened tubular food casing 15 so that the food casing 15 is adequately supported when penetrated by punch 20 without becoming unduly displaced or indented. Polyurethene having a hardness of from about 65 to 85, as measured on the Shore "A" scale, has been found to be satisfactory for use as the resilient surface 26.

The flat-faced, sharp-edged ends 21 of the punches 20 are assembled in roll 22 to extend or protrude a sufficient distance beyond the circumferential surface of punch roll 22 to penetrate both plies of a flattened web of tubular food casing 15 and to impress the resilient surface 26 of support roll 24 to a degree sufficient to accomodate both plies of the food casing 15, but insufficient to prevent elastic return of or cutting or tearing of the resilient surface 26.

The diameter of punch roll 22 should be smaller than the diameter of the support roll 24, including the resilient surface 26, to provide a localized deformation of the resilient surface 26 at the nip and to minimize repetitive penetration of punch 20 at the same spot in the resilient surface 26. In a preferred embodiment, the diameter of the support roll 24, including the resilient surface 26, is from about 2.0 to 3.5 times greater than that of the punch roll 22. The radius of curvature of the punch roll 22 should be a function of the diameter of the punch 20 to prevent tearing of the food casing 15. Hence, for a punch 20 having a diameter of about 0.010 inch, the diameter of the punch roll 22 should be about 3.0 inch.

In FIG. 4, reference numeral 28 denotes the line showing the arc of travel of punch 20 before, during, and after penetrating the flattened tubular food casing 15. Reference numeral 27a denotes the point at which punch 20 begins to penetrate the food casing 15; reference numeral 27b denotes the point at which punch 20 has penetrated both plies of food casing 15; reference numeral 27c denotes the point at which punch 20 is removed from both plies of the food casing 15; and, reference numeral 29 denotes the angle subtended by points 27a and 27c. Subtended angle 29, therefor, is equal to the arc of rotation of punch 20 between points 27a and 27c on line 28.

In FIG. 5, reference numeral 15a denotes a punched out slug from food casing 15.

FIGS. 6 and 6a illustrate one manner in which a plurality of punches 20 can be mounted on punch roll 22. Punch roll 22 is comprised of a plurality of mating plain and grooved discs 23a and 23b, respectively, which are commonly mounted on a shaft. Grooved disc 23b has V-grooves 25 machined therein. As shown in FIG. 6a, the punches 20 are gripped in the grooves 25 of grooved disc 23b by the flat surface of disc 23a and are axially secured on the punch roll shaft. Punches 20 should be mounted so that the perforations in the food casing 15 are staggered. Preferably, the formed perforations should be spaced apart from each other in a staggered configuration at a distance of at least about 50 times greater than the diameter of the formed perforations.

In FIG. 7 there is illustrated a food casing 15 having perforations 30 formed and defined therein by the apparatus of the present invention. Reference numerals 30a, 30b and 30c denote the center lines of linear rows of perforations 30, the linear rows of perforations being parallel to the longitudinal axis of the food casing 15.

In a typical operation of the apparatus of the invention, a plurality of punches 20 (FIG. 3) were radially mounted on a punch roll 22 (FIGS. 4–6a) so that the punches protruded a distance of about 0.020 inch from the circumferential surface of the punch roll 22. The punches 20 were fabricated from piano wire and had a diameter of about 0.012 inch. After assembly in the punch roll 22, the edges of the punches 20 were ground to a uniform diameter to insure that the cutting edges 21 of the punches 20 were all of the same height and sharpness.

The support roll 24 was provided with a polyurethene resilient surface 26 having a Shore "A" scale hardness of about 75. (FIGS. 4 and 5). The diameter of the support roll 24, including the resilient surface 26, was about two times greater than the diameter of the support roll 22.

A flattened web of tubular fibrous food casing 15 having a flat width of about 6.25 inch and a single wall thickness of about 0.004 inch (flattened double ply thickness: about 0.008 inch) was advanced between punch roll 22 and support roll 24 (FIGS. 4 and 5). Punch roll 22 and support roll 24 were positioned, with respect to each other, so that the resilient surface 26 was slightly compressed in a nip as shown in FIG. 5.

In a preferred embodiment, the distance between the mounting shafts of punch roll 22 and support roll 24 is about 0.001 inch less than the combined radii of the punch roll 22, comprising discs 23a and 23b, and support roll 24, including resilient surface 26.

To advance the flattened tubular food casing 15 to the nip, support roll 24 was driven. Alternatively, the web of flattened tubular food casing 15 can be advanced to the nip independently and punch roll 22 and support roll 24 can be mounted on their respective shafts so that they freely rotate as a result of the forces applied to the nip by the food casing 15 being advanced therethrough.

As the flattened web of fibrous food casing 15 was advanced to the nip between punch roll 22 and support roll 24, the sharp-edged punches 20 punched and cut holes in the top ply of the food casing 15 during which time, the top ply was supported by the bottom ply. The punches 20 then punched and cut holes in the bottom ply of the food casing 15 during which time the bottom ply was supported by the resilient surface 26 of the support roll 24. Hence, the punches 20 remained in the holes formed in the top ply while they were punching and cutting the holes in the bottom ply so that the punches 20 penetrated both plies of the flattened tubular food casing 15. Due to the configuration of the sharp-edged ends 21 of punches 20 and the nature of the resilient surface 26, a plurality of slugs 15a comprising both plies of the flattened tubular food casing 15, were, in effect, die-cut from the the flattened tubular food casing 15 and deposited within the resilient surface 26. (FIG. 5). Many of these slugs 15a later dropped out freely from the resilient surface 26 so that resilient surface 26 had a greater service life than similar prior art rolls. The long service life of resilient surface 26 was also attributable, in part, to the relatively larger diameter of support roll 24 so that punches 20 were not constantly penetrating the resilient surface 26 in a repetitive pattern.

A tubular perforated food casing 15 was obtained as shown in FIG. 7, wherein the defined perforations 30 formed a staggered configuration and had a diameter of about 0.012 inch. The center lines 30a, 30b and 30c of each linear row of defined perforations 30 were found to be about 0.5 inch from each other. Consequently, each perforation 30 was spaced apart from each adjacent perforation at a distance of at least about 50 times the diameter of each formed perforation 30.

Perforated food casings obtained according to the method of the invention were examined under magnification and were found to have, in the penetrated top ply, formed perforations clean cut and substantially free of inwardly disposed vent flaps, flanges or lips of casing about the defined perforations. In the penetrated bottom ply, the formed perforations were found to have edges of casing material extending outwardly from the surface of the food casing. The perforations formed and defined in food casings according to the method and apparatus of the invention, therefore, can be characterized in that at least one half the perforations have edges which circumscribe the formed perforations and are clean cut and coextensive with the surface of the food casing while the other half of the formed perforations can be characterized as having edges of casing material extending outwardly from the surface of the food casing.

By varying the positions of the punches 20 in punch roll 22, perforations 30 can be selectively formed on various portions of the surface of a flattened tubular food casing 15. For example, the punches 20 can be mounted so that only one-half or one-quarter of the total circumferential surface of the tubular food casing 15 has perforations 30 formed and defined therein.

While the present invention has been described in some detail and with particularity, it should be understood that changes, modifications and alterations can be made therein without departing from the scope and spirit of the invention.

What is claimed is:

1. A method for forming perforations in flattened tubular food casings, comprising:

a. advancing a flattened tubular food casing having a top and bottom ply over a resilient support surface;

b. urging at least one punch into contact with the top ply of flattened tubular food casing to penetrate said top ply while said top ply is in contact with and supported by a bottom ply of the food casing to form clean-cut holes in said top ply by punching and cutting a slug portion therefrom;

c. retaining said slug portion cut out from said top ply between said punch and said bottom ply;

d. urging said punch and said slug portion against said bottom ply to punch and cut a slug portion from the bottom ply of food casing supported by the resilient support surface, thus forming holes therein with said punch;

e. retaining said punch in holes formed in said top and bottom plies of said casing to retain said slug portions between said punch and said resilient surface while urging said punch toward said resilient surface to indent the same and to deposit said slug portions in the indentation so formed; and f. removing said punch from the holes cut in the top and bottom plies of the food casing.

2. The method of claim 1 wherein the diameter of each formed perforations is from about 2.0 to 6.0 times greater than the thickness of a single ply of the tubular food casing.

3. The method of claim 1 wherein each formed perforation is spaced apart from each other in a staggered configuration at a distance greater than about 50 times the diameter of the thusly formed perforations.

4. A tubular food casing comprising a tubular fibrous cellulosic food casing having a plurality of spaced perforations formed in the wall thereof distributed about the circumference of said casing, the diameter of said perforations being about 2.0 to 6.0 times greater than the thickness of the wall of said tubular casing, said casing being substantially free of inwardly disposed vent flaps, flanges or lips about the perforations in the wall thereof, perforations in the wall about one portion of the circumference of said tubular casing being clean cut, the edges defining and circumscribing said perforations being coextensive with the surface of the wall of said casing and perforations in the wall about the other portion of the circumference of said tubular casing having edges extending outwardly from the surface of the wall of said tubular casing, perforations in each portion of the circumference of said tubular casing being substantially equal in number.

\* \* \* \* \*